June 11, 1929.  H. BANY ET AL  1,717,302
PRIME MOVER PLANT
Filed Jan. 5, 1928
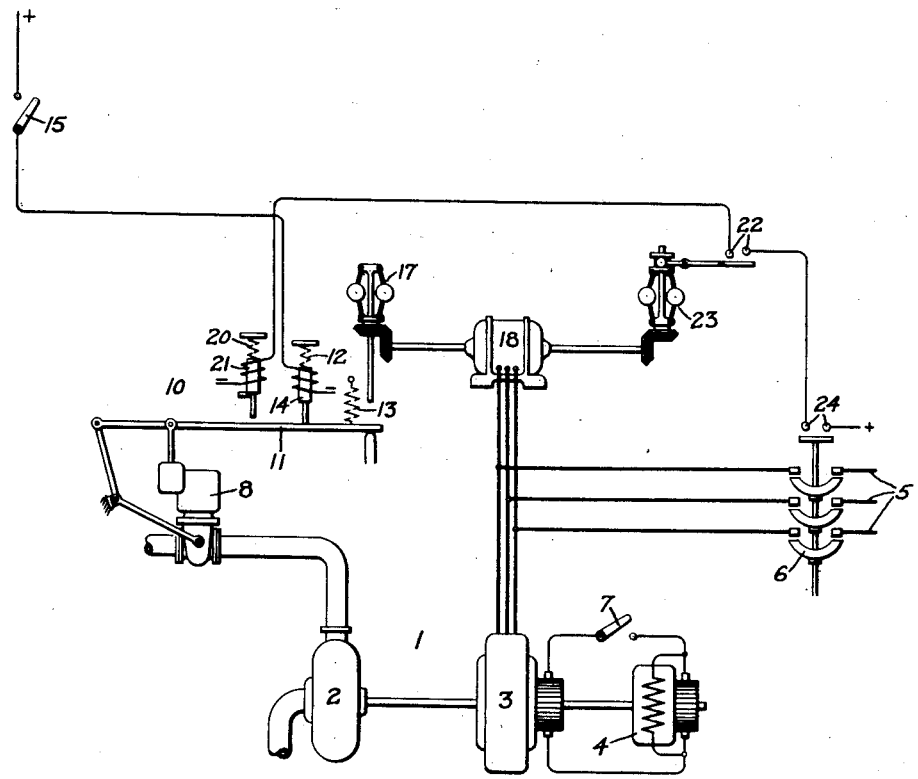
Inventor:
Herman Bany
Harold T Seeley
by *Alexander F. ...*
His Attorney Patented June 11, 1929.

1,717,302

UNITED STATES PATENT OFFICE.

HERMAN BANY AND HAROLD T. SEELEY, OF YEADON, PENNSYLVANIA, ASSIGNORS TO GENERAL ELECTRIC COMPANY, A CORPORATION OF NEW YORK.

PRIME-MOVER PLANT.

Application filed January 5, 1928. Serial No. 244,582.

Our invention relates to prime mover plants and particularly to such plants in which speed responsive means such as motor driven fly ball governors are used to control the operation thereof and its object is to provide a protective arrangement for preventing a prime mover whose speed is being governed by the speed responsive means from running away due to failure of the speed responsive means.

In prime mover dynamo electric plants it is sometimes desirable to control the operation of a governor indirectly by means of an electric motor or other suitable speed responsive means whose speed depends upon the speed of the primer mover instead of controlling the operation of the governor directly in response to the speed of the prime mover. When such auxiliary speed responsive means are used it is important to prevent the governor from opening the gate wide open when such speed responsive means fail for any reason. In accordance with our invention we provide an arrangement whereby the governor is operated to close the gates controlling the supply of energy to the prime mover to a predetermined small opening whenever the speed responsive means fail.

Our invention will be better understood from the following description taken in connection with the accompanying drawing which shows a control system for a hydroelectric station embodying our invention and its scope will be pointed out in the appended claims.

Referring to the accompanying drawing, 1 represents a prime mover dynamo electric plant comprising a water wheel 2, which drives a generator 3 and an exciter 4. The generator 3 is arranged to be connected to an electric circuit 5 by means of suitable switching means 6 and the exciter 4 is arranged to be connected to the generator field winding by suitable switching means 7. The operation of these switching means may be controlled either automatically or manually in any suitable manner examples of which are well known in the art. In order to simplify the disclosure, however, it is assumed in the embodiment of our invention shown in the drawing that the switching means 6 and 7 are manually closed.

The supply of fluid energy to the water wheel 2 may be controlled by any suitable means such as a gate 8, the opening of which in turn is controlled by a suitable speed responsive device such as a flyball governor 10 which may be of any suitable type, examples of which are well known in the art. As diagrammatically indicated in the drawing, the governor comprises a movable member 11 which is arranged in any suitable manner, examples of which are well known in the art, so that the position thereof determines the opening of the gate 8. The member 11 is shown in the gate closed position. It is held in this position by a spring 12 against the bias of a spring 13. When it is desired to open the gate 8 to start the prime mover 2, the spring 12 is moved out of operative relation with the member 11 so that the spring 13 is free to move the rod upwardly. As shown, a magnet 14 is provided for moving the spring 12 out of operative relation with the member 11. The energization of this magnet 14 may be effected in any desirable manner. As shown, the energization of the magnet 14 is arranged to be effected in response to the closing of a manually controlled switch 15.

In order to control the position of the member 11 so as to maintain the speed of the prime mover 2 at a predetermined value while the plant is in operation, suitable means responsive to the speed of the prime mover 2, such as the motor driven fly balls 17, are provided. These fly balls are driven by a motor 18 energized by the generator 3 and arranged in such a manner that the motor speed varies with the frequency of the generator, which in turn varies with the speed of the prime mover. The fly balls 17 are arranged so that when the frequency of the generator 3 is above a predetermined value they move the member 11 against the bias of the spring 13 to effect a decrease in the amount of fluid energy supplied to the prime mover 2 and when the frequency of the generator is below a predetermined value they permit the spring 13 to move the member 11 so as to effect an increase in the amount of fluid energy supplied to the prime mover 2. Therefore, it will be noted that if for any reason the motor 18 should fail to drive the fly balls 17 while the magnet 14 is energized, the spring 13 would cause the member 11 to move to its maximum gate opening position. If this failure of the motor 18 to operate should occur while the generator is disconnected from the load circuit, it might result in the prime mover running away as there would be no load on the plant. If this failure should occur while the generator is supplying current it might result in an overload on the generator which would cause the disconnection of the generator from the load circuit. The load on the generator 3 would therefore be decreased so that the prime mover might run away.

In order to prevent such a run away of the prime mover 2 due to the failure of the motor 18 to operate, we provide a protective arrangement for limiting the gate opening to a predetermined value whenever the motor 18 fails to operate. Preferably this gate opening is the running light position, that is, the position which is just sufficient to permit the prime mover to start from rest and accelerate to a speed slightly above the synchronous speed of the generator. In the particular embodiment shown in the drawing, the movement of the member 11 by the spring 13 is limited to a predetermined gate opening by an opposing spring 20 whenever a magnet 21 is deenergized. When, however, the magnet 21 is energized the spring 20 is moved out of operative relation with the member 11 so that the spring 13 is free to move the member 11 to a larger gate opening position. As shown, the circuit of the magnet 21 is arranged to be completed by means of contacts 22 which are controlled by suitable speed responsive means 23 controlled by the motor 18 so that they are closed only when the speed of the motor 18 is above a predetermined subnormal value. Preferably the circuit of the magnet 21 also includes contacts 24 controlled by the position of the switch 6 so that the gate opening is also limited to a predetermined value when the generator 3 is disconnected from the load circuit.

The operation of the arrangement shown is as follows: When it is desired to start the plant 1, switch 15 is closed so that magnet 14 is energized. Spring 12 is thereby moved out of operative relation with the member 11 so that the spring 13 is free to move the rod to the running light position in which position it is stopped by the spring 20. This movement of the member 11 effects the opening of the gate 8 to its running light position in a manner well known in the art so that the prime mover 2 starts and accelerates the generator 3 to synchronous speed. At the proper time during the starting operation the switches 6 and 7 are closed so that excitation is applied to the generator 3 and the generator is connected to the load circuit 5. As soon as the voltage applied to the motor 18 is above a predetermined value it starts to operate and runs at a speed dependent upon the frequency of the current applied thereto. When the motor speed is above a predetermined value so that contacts 22 are closed and the switching means 6 is closed so that the auxiliary contacts 24 are closed, the magnet 21 becomes energized and the spring 20 is moved out of operative relation with the member 11. The position of the member 11 then depends upon the position of the flyballs 17.

If the voltage applied to the motor 18 fails, or the speed of the motor 18 decreases below a predetermined value for any other reason, the contacts 22 open and the magnet 21 becomes deenergized so that the spring 20 restores the number 11 to its running light position, thereby causing the gate 8 to be closed to its running light position. Similarly if the switching means 6 opens for any reason while the plant is in operation, the circuit of the magnet 21 is opened and the gate is moved to its running light position by the spring 20.

Therefore it will be noted that we have provided a simple arrangement for preventing a prime mover plant from running away under certain abnormal conditions thereof.

While we have in accordance with the patent statutes shown and described our invention as applied to a particular system and as embodying various devices diagrammatically indicated, changes and modifications will be obvious to those skilled in the art and we therefore aim in the appended claims to cover all such changes and modifications as fall within the true spirit and scope of our invention.

What we claim as new and desire to secure by Letters Patent of the United States, is:

1. In combination, a prime mover, a governor for controlling the supply of energy to said prime mover, means responsive to the speed of said prime mover for controlling the operation of said governor, and means responsive to a speed failure of said speed responsive means for limiting the supply of energy to said prime mover to a predetermined small amount so as to prevent the prime mover from running away.

2. In combination, a prime mover, a generator driven by said prime mover, a fly ball governor for controlling the supply of energy to said prime mover, an electric motor energized from said generator for driving the fly balls of said governor, and means operative in response to a failure of current to said motor for causing said governor to limit the supply of energy to said prime mover to a predetermined small amount so as to prevent the prime mover from running away.

3. In combination, a prime mover, a gate for controlling the supply of energy to said prime mover, a fly ball governor for controlling the opening of said gate, an electric motor for driving the fly balls of said governor, means for energizing said motor in accordance with the speed of said prime mover, and means responsive to the speed of said motor for causing said governor to limit the gate opening to a predetermined small amount when the speed of said motor is below a predetermined subnormal value.

4. In combination, a prime mover, a governor for controlling the supply of energy to said prime mover, and means dependent upon the speed of said prime mover for causing said governor to limit the amount of energy supplied to said prime mover to a predetermined small amount when the speed thereof is below a predetermined subnormal value and to regulate the amount of energy supplied to said prime mover so as to maintain a predetermined speed thereof when the speed of said prime mover is above said subnormal value.

5. In combination, a prime mover, a fly ball governor for controlling the supply of energy to said prime mover, an electric motor for driving the fly balls of said governor, means for supplying current to said motor having a frequency which varies in accordance with the speed of said prime mover, and means controlled in accordance with the energization of said motor for causing said governor to limit the amount of energy supplied to said prime mover to a predetermined small amount when the frequency of the current supplied to said motor is below a predetermined subnormal value.

6. In combination, a prime mover, a governor therefor comprising a movable member which is arranged to control by its position the amount of energy supplied to said prime mover, protective means for maintaining said member in a predetermined position whereby the amount of energy supplied to said prime mover is limited to a predetermined small amount, means dependent upon the speed of said prime mover adapted to control the position of said movable member, and means dependent upon a predetermined condition of said speed responsive means for rendering said protective means inoperative to maintain said member in said predetermined position.

7. In combination, a prime mover, a fly ball governor for said prime mover including a movable member which is arranged to control by its position the amount of energy supplied to said prime mover, protective means for maintaining said member in a predetermined position whereby the amount of energy supplied to said prime mover is limited to a predetermined small amount, an electric motor for driving the fly balls of said governor, means for supplying a current to said motor which varies with the speed of said prime mover, electroresponsive means for rendering said protective means inoperative to limit the amount of energy supplied to said prime mover, and means responsive to the speed of said motor for controlling the energization of said electroresponsive means.

8. In combination, a prime mover, a generator driven by said prime mover, a fly ball governor for said prime mover including a movable member which is arranged to control by its position the amount of energy supplied to said prime mover, protective means for limiting the movement of said member to a predetermined position so as to limit the amount of energy supplied to said prime mover to a predetermined small amount, an electric motor connected to said generator for driving the fly balls of said governor, a magnet arranged when energized to render said protective means inoperative to limit the movement of said member, and means responsive to the speed of said motor for effecting the energization of said magnet when the speed of said motor is above a predetermined value.

9. In combination, a prime mover, a generator driven by said prime mover, a governor for said prime mover including a movable member which is arranged to control by its position the amount of energy supplied to said prime mover, protective means for limiting the movement of said member to a predetermined position so as to limit the amount of energy supplied to said prime mover to a predetermined small amount, means responsive to the speed of the prime mover for controlling the position of said member so as to maintain the speed of the prime mover constant, an electric circuit, switching means for connecting said generator to said circuit, electroresponsive means for rendering said protective means inoperative to limit the movement of said member, and means controlled by said switching means for controlling the energization of said electroresponsive means.

10. In combination, a prime mover, a generator driven by said prime mover, a governor for said prime mover including a movable member which is arranged to control by its position the amount of energy supplied to said prime mover, protective means for limiting the movement of said member to a predetermined position so as to limit the amount of energy supplied to said prime mover to a predetermined small amount, means responsive to the speed of the prime mover for controlling the position of said member so as to maintain the speed of the prime mover constant, an electric circuit, switching means for connecting said generator to said circuit, a magnet arranged when energized to render said protective means inoperative to limit the movement of said member, a circuit for said magnet, and means controlled by said switching means for controlling the said magnet circuit so that it can be completed only when said switching means is closed.

In witness whereof, we have hereto set our hands this 30th day of December, 1927.

HERMAN BANY.
HAROLD T. SEELEY.